United States Patent [19]

Miyake

[11] Patent Number: 4,760,303
[45] Date of Patent: Jul. 26, 1988

[54] ELECTROSTATIC HIGH-VOLTAGE GENERATOR

[75] Inventor: Yoshinobu Miyake, Simonoseki, Japan

[73] Assignee: Japan Physitec Instrument Co., Ltd., Tokyo, Japan

[21] Appl. No.: 15,089
[22] PCT Filed: Jun. 11, 1986
[86] PCT No.: PCT/JP86/00292
  § 371 Date: Apr. 10, 1987
  § 102(e) Date: Apr. 10, 1987
[87] PCT Pub. No.: WO86/07506
  PCT Pub. Date: Dec. 18, 1986

[30] Foreign Application Priority Data

Jun. 11, 1985 [JP] Japan .................. 60-125213

[51] Int. Cl.⁴ ............................................. H02N 1/00
[52] U.S. Cl. ..................................... 310/308; 310/309; 322/2 A
[58] Field of Search ............... 322/2 A; 310/308, 309, 310/310

[56] References Cited

U.S. PATENT DOCUMENTS

| | | | |
|---|---|---|---|
| 2,058,732 | 10/1936 | Simon | 171/329 |
| 2,577,446 | 12/1951 | Bosch | 310/309 |
| 2,610,994 | 9/1952 | Bosch et al. | 171/329 |
| 2,662,191 | 12/1953 | Okey | 310/309 |
| 2,675,516 | 4/1954 | Felici | 322/2 |
| 3,035,221 | 5/1962 | Gale | 322/2 A |
| 3,469,118 | 9/1969 | Herb et al. | 310/309 |
| 3,612,919 | 10/1971 | Herb et al. | 310/6 |
| 3,614,481 | 10/1971 | Halliday | 310/309 |
| 3,889,138 | 6/1975 | Allen | 310/309 |
| 3,891,868 | 6/1975 | Joyce | 310/308 |

FOREIGN PATENT DOCUMENTS 55-40380 3/1982 Japan .

Primary Examiner—R. Skudy
Attorney, Agent, or Firm—Armstrong, Nikaido, Marmelstein & Kubovcik

[57] ABSTRACT

This invention relates to an electrostatic high-voltage generator in which an electrostatic charge is transported mechanically and is stored on a high-voltage electrode, and plural layers of charge carrier unit for carrying electrostatic charges, are stacked in a direction at right angles with the direction of carrying the charge, and there is provided between respective adjacent ones of those charge carrier units, a charge carrying transfer means for carrying an electric charge carried to the adjacent charge carrier unit. The apparatus can generate an ultra high-voltage and can be constructed economically into a small-sized one.

5 Claims, 4 Drawing Sheets

ELECTROSTATIC HIGH-VOLTAGE GENERATOR

TECHNICAL FIELD

This invention relates to an electrostatic high-voltage generator wherein an electrostatic charge is transported mechanically and is accumulated in a high-voltage electrode for obtaining a high-voltage.

BACKGROUND ART

As for an electrostatic high-voltage generator in which an electrostatic charge is transported mechanically and accumulate in a high voltage electrode for obtianing a high voltage, there has been known, for instance, a pellet chain type high-voltage generator, a disc type high voltage generator or the like.

A principle of the pellet chain type high voltage generator is such that, as shown in FIG. 4, a large number of conductive pellets 1 and insulating members 2 are connected together alternatively and flexibly to form a charge carrier unit 3 of a pellet chain, so that if the charge carrier unit 3 is moved between a ground side pulley 4 and a high-voltage side pulley 5, and a negative voltage is applied to a ground side inductor 6 from an electric source 7, a positive electric charge is induced electrostatically to each conductive pellet 1, while a negative electric charge is repelled to escape to the ground side pulley 4, and thus positive electric charge remains at each pellet 1 and is carried from the low-voltage side pulley 4 towards a high voltage electrode 8 and is accumulated therein to result in a high voltage.

In addition, similarly, a negative electric charge is given to each pellet 1 of the charge carrier chain 3 from a high-voltage side inductor 9 associated with the high-voltage electrode 8 and is carried to the ground side pulley 4, and thus by reciprocating the charge carrier unit 3 between the ground side pulley 4 and the high voltage side pulley 5, so that there can be carried doubled electric charges.

A principle of the disc type high-voltage generator is such that, as shown in FIG. 5, a charge carrier unit 3 is constructed into such a disk type one that conductive pellets 1 are disposed along on a circumferential edge of a rotary insulating disc 10, so that in the course of turning of the insulating disc 10, a positive electric charge is given to each pellet 1 from a conductive pulley 12 of a ground side inductor 11, and this positive electric charge carried by each pellet 1 is received by a conductive pulley 14 of a high-voltage side inductor 13 and is accumulated in a high-voltage electrode 8 to result in a high voltage.

In addition, a negative electric charge is given to each pellet 1 from a conductive pulley 16 of another high-voltage side inductor 15 in the high-voltage electrode 8, and is received by a conductive pulley 18 of a ground side inductor 17 provided on the ground side, and thus by one round of the insulation disc 10 of the charge carrier unit 3 between the ground side inductors 11 and 17, there can be carried doubled electric charges.

The pellet chain type and the disc type high-voltage generators shown principally in FIGS. 4 and 5 are so arranged as to be accommodated in respective containers each of which is filled with a SF$_6$ insulation gas of 7 kg/cm$^2$ in pressure, and the highest potential gradient in the direction of carrying the charge is 2 Mv/m, in the SF$_6$ insulation gas of the pressure of 7 kg/cm$^2$. This highest potential gradient of 2 Mv/m is regulated by the shape, the size and the number of the disposed conductive pellets 1, the insulating resistance force of the insulating members 2 and that of the insulation disc 10 in FIGS. 4 and 5.

Accordingly, in order to obtain a higher voltage in the pellet chain type and the disc type high voltage generators, there is no means other than heightening the insulating gas pressure, elongating the distance in the charge carrying direction of the chain or enlarging the diameter of the insulation disc in FIGS. 4 and 5.

However, in any of the types of high-voltage generators, the mechanism thereof are accommodated in the pressure container of the SF$_6$ insulating gas in order to obtain a small-sized one as a whole, so that, if the gas pressure is heightened, the maintenance of the insulating gas and the constructional design of the pressure container become difficult.

The increase in the carrying distance of the chain and the diameter of the insulating disc involves an increase in installation area, which is not always considered as an economical design.

OBJECT OF INVENTION

An object of this invention is to provide an electrostatic high-voltage generator which can obtain a higher voltage and can be constructed into a compact, small-sized generator without causing an increase in installation area as much as possible.

DISCLOSURE OF THE INVENTION

In views of the fact that the highest potential gradient in the charge carrying direction is 2 Mv/m in the SF$_6$ insulating gas of 7 kg/cm$^2$ in pressure but a potential gradient in a direction at right angles with the direction of carrying the charge is 20 Mv/m; an electrostatic high-voltage generator of this invention is characterized in that plural layers of charge carriers units are stacked in a direction at right angles with the charge carrying direction, and a charge carrying transfer means is provided between respective adjacent ones of the charge carrier units.

BEST MODE OF CARRYING OUT THE INVENTION

Figure 1:
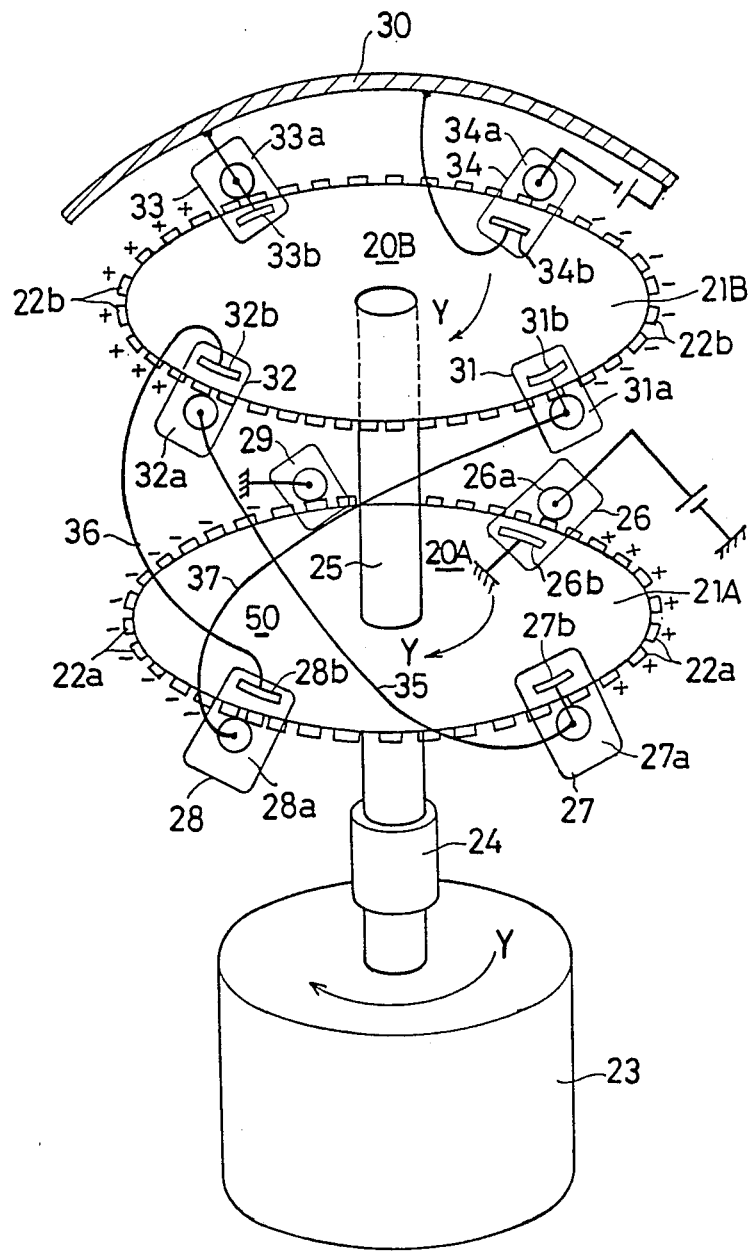
FIG. 1 is a perspective view of one embodying example of this invention electrostatic high-voltage generator.

This invention will be expained with reference to embodying examples thereof shown in FIGS. 1-3 as follows:

First, a principle of an electrostatic high-voltage generator according to this invention will be explained with reference toa disc type one thereof shown in FIG. 1.

Two disc type charge carrier units 20A, 20B are such that a large number of conductivity pellets 22a, 22b are secured along on circumferential edges of insulating discs 21A, 21B and are provided in a stack with a space left there-between, on an insulating rotary shaft 25 connected directly to a rotary shaft 24 of a driving motor 23 so as to be turnable at a predetermined speed by the driving motor 23.

Around the rotary insulating disc 21A of the charge carrier unit 20A of the first stage, there is arranged a ground side inductor 26 for charging which comprises a conductive pulley 26a arranged to contact the pellets 22a thereto by turning of the insulating disc 21A and an inductor electrode 26b, a first inductor 27 for charge carrying transfer which is provided at a predetermined interval from the foregoing inductor 26 and comprises a conductive pulley 27a arranged to contact the pellets 22a and an inductor electrode 27b, a fourth inductor 28 for charge carrying transfer which is provided at a predetermined interval from the foregoing inductor 27 and comprises a conductive pulley 28a arranged to contact the pellets 22a and an inductor electrode 28b, and a ground side conductive pulley 29 for current colelction provided at a predetermined interval from the foregoing inductor 28.

An upper portion of the charge carrier unit 20B of the second stage is covered with a high-voltage electrode 30, and around the insulating disc 21B thereof, there is arranged a third inductor 31 for charge carrying transfer which comprises a conductive pulley 31a and an inductor electrode 31b, a second inductor 32 for charge carrying transfer which is provided at a predetermined interval from the foregoing inductor 31 and comprises a conductive pulley 32a and an inductor electrode 32b, a high-voltage side inductor 33 for current collection which is provided at a predetermined interval from the foregoing inductor 32 and comprises a conductive pulley 33a and an inductor electrode 33b, and an inductor 34 for negative electric charge charging which comprises a conductive pulley 34a for charging a negative electric charge to the pellets 22b and an inductor electrode 34b.

The conductive pulley 26a of the ground side inductor 26 for charging provided on the first stage charge carrying unit 20A is arranged to be given a positive electric charge, and the inductor electrode 26b thereof is grounded. The conductive pulley 27a of the first inductor 27 for charge carrying transfer is electrically connected to the inductor electrode 27b, and the conductivity pulley 27a of this inductor 27 is connected, through a conductor 35, to the conductive pulley 32a of the second inductor 32 for charge carrying transfer of the charge carrying unti 20B of the second stage. The inductor electrode 32b of the second inductor 32 for charge carrying transfer is connected, through a conductor 36, to the inductor electrode 28b of the fourth inductor 28 for charge carrying transfer.

Additionally, the conductive pulley 28a of the fourth inductor 28 for charge carrying transfer is connected, through a conductor 37, to be conductive pulley 31a of the third inductor 31 for charge carrying transfer. In addition, the conductive pulley 31a and the inductor electrode 31b of the third inductor 31 for charge carrying transfer are connected electrically one to another, and the conductive pulley 33a and the inductor electrode 33b of the high voltage side inductor 33 for current collection are interconnected together electrically. The inductor electrode 34b of the inductor 34 for negative electric charge charging is connected to the high-voltage electrode 30.

Thus, by the first, second, third and fourth inductors 27, 32, 31, 28 for charge carrying transfer and the mutual connection relationship between those, there is constructed such a charge carrying transfer unit 50 between the charge carrying unit 20A of the first stage and the charge carrying unit 20B of the second stage that is the characteristics of this invention.

Next, an operational principle of the electrostatic highvoltage generator of this invention constructed as above will be explained as follows:

Now, the charge carrier units 20A, 20B are rotated in the direction shown by an arrow Y by the driving motor 23, and thereby a positive electric charge is charged, from the conductive pulley 26a of the ground side inductor 26 for charging, to the conductive pellets 22a of the insulating disc 21A of the first stage charge carrying unit 20A. This positive electric charge is carried by a procession of the pellets 22a and is completely received by the conductive pulley 27a of the first inductor 27 for charge carrying transfer.

Since the pulley 27a and the inductor electrode 27b of the inductor 27 are interconnected electrically, the collected positive electric charges are passed through the conductor 35 and are transferred from the conductive pulley 32a of the second inductor 32 for charge carrying transfer to the pellets 22b of the charge carrier unit 20B of the second stage, and are accumulated in the high-voltage inductor 30 through the conductive pulley 33a of the high-voltage inductor 33.

Meanwhile, at the second inductor 32 for charge carrying transfer, a negative electric charge is induced electrostatically at the inductor electrode 32b, while a positive electric charge is collected to the inductor electrode 28b of the fourth inductor 28 for charge carrying transfer which is electrically connected through the conductor 36 to the foregoing inductor electrode 32b, and thus the two electrodes 32b, 28b are balanced one with another in respect of electric charges. This balance phenomenon in respect of electric charges is convenient for carrying a negative electric charge of the high-voltage side charge carrier unit 20B of the second stage to the ground side first stage charge carrier unit 20A.

Meanwhile, a negative electric charge is charged to a procession of the pellets 22b of the charge carrying unit 20B of the second stage from the conductive pulley 34a of the inductor 34 for negative electric charge charging provided on the high-voltage electrode 30. This negative electric charge is received by the conductive pulley 31a of the third inductor 31 for charging carrying transfer, when each pellet is passed through the inductor 31 in accordance with the tunring of the insulating disc 21B. This negative electric charge is transferred, through the conductor 37, from the conductive pulley 28a of the fourth inductor 28 for charge carrying transfer to the pellets 22a of the insulating disc 21A. The negative electric charges of this procession of pellets 22a are collected at the ground side conductive pulley 29 for current collection according to the turning of the insulatiing disc 21A.

Thus, there is obtained, at the high-voltage electrode 30 provided above the charge carrying unit 20B of the second stage, a double voltage 2E which is double as high as the high voltage E obtained at each of the charge carrier units 20A, 20B. If any desired number of the insulation discs of the charge carrying units are stacked in layers, a high voltage of twice, three times and so on can be generated in proportion to the number of the layers.

Additionally, in FIG. 1, the positive electric charges of the pellets 22a between the inductors 26, 27 of the charge carrier unit 20A of the first stage and the negative electric charges of the pellets 22b between the inductors 34, 31 of the charge carrier unit 20B of the second stage are opposite one to another, and a row of the negative electric charges between the inductors 28, 29 of the charge carrying unit 20A of the first stage and a row of the positive electric charges betwen the inductors 32, 33 of the charge carrying unit 20B of the second stage are opposite one to another, so that the two units 20A, 20B are balanced one with another electrostatically, and there is not generated any load on the driving motor 23, and the two units 20A, 20B are driven stably and the electric charges can be carried with a high efficiency.

Figure 2:
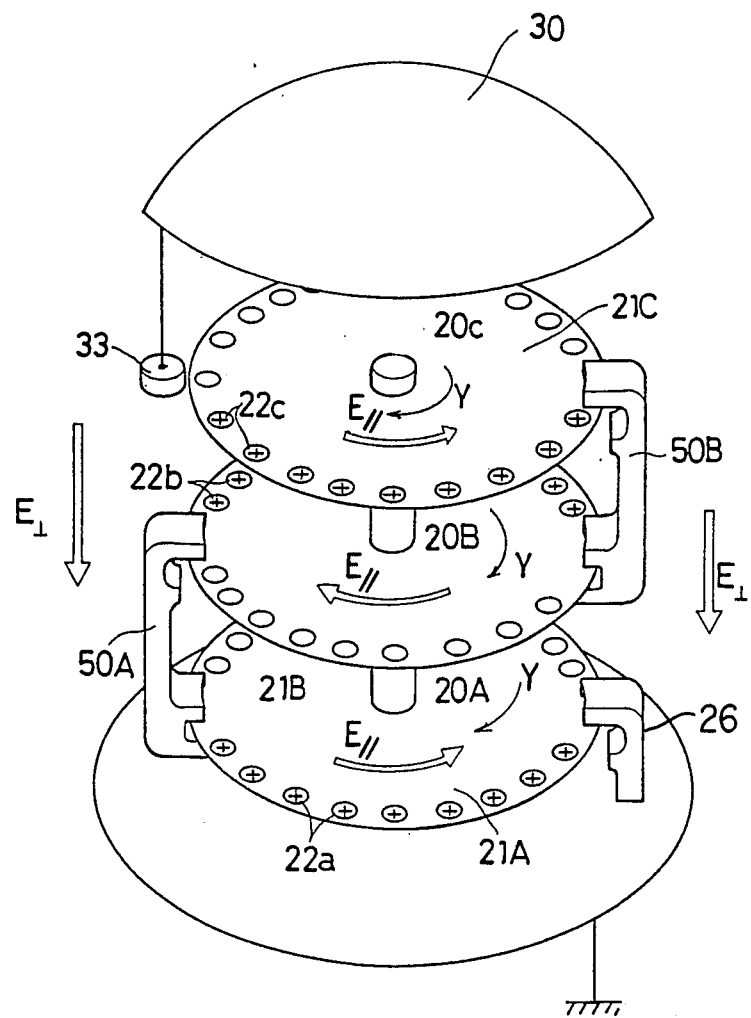
FIG. 2 is a perspective view of another embodying example thereof.

In an embodying example shown in FIG. 2, three stages of charge carrier units 20A, 20B, 20C are put one upon another in a stack so as to generate a threefold high-voltage.

A first charge carrying transfer unit 50A is provided between the charge carrying unit 20A of the first stge and the charge carrying unit 20B of the second stage, and a second charge carrying transfer unit 50B is proivided between the charge carrying unit 20B of the second stage and the charge carrying unit 20C of the third stage.

A positive electric charge given to the conductive pellet 22a of a first stage insulating disc 21A from a ground side inductor 26 for charging is trnasferred, in conjunction with turning of the insulating disc 21A, through the first charge carrying transfer unit 50A, to conductive pellets 22b of a second stage insulating disc 21B. Further, this positive electric charge is transferred,in conjunction with turning of the second dtage insulating disc 21B, through second charge carrying transfer unit 50B to conductive pellet 22c of the third insulating disc 21C, and is finally collected at a high-voltage side inductor 33 for being tored in a high-voltage electrode 30. The voltage of this high-voltage electrode 30 is three times as high as the voltage of a single charge carrier unit.

If, in FIG. 2, the intensity of electric field along on the charge carrying path of each of the respective charge carrier units 20A, 20B, 20C is assumed to be $E_{//}$, a practical value of this intensity of electric field $E_{//}$ is below 20 Mv/m. If each of respective potential gradients generated between the charge carrying unit 20C of the third stage and charge carrying unit 20B of the second stage, and between the charge carrying unit 20B of the second stage and the charge carrying unit 20A of the first stage is assumed to be $E_1$, a value of the potential gradient $E_1$ can be made above 20 Mv/m. This potential gradient $E_1$ secures a withstanding voltage of above 10 times as much as the intensity of electric field intensity $E_{11}$, and this is an important characteristic point of this invention for realizing an ultra high potential gradient generator.

Figure 3:
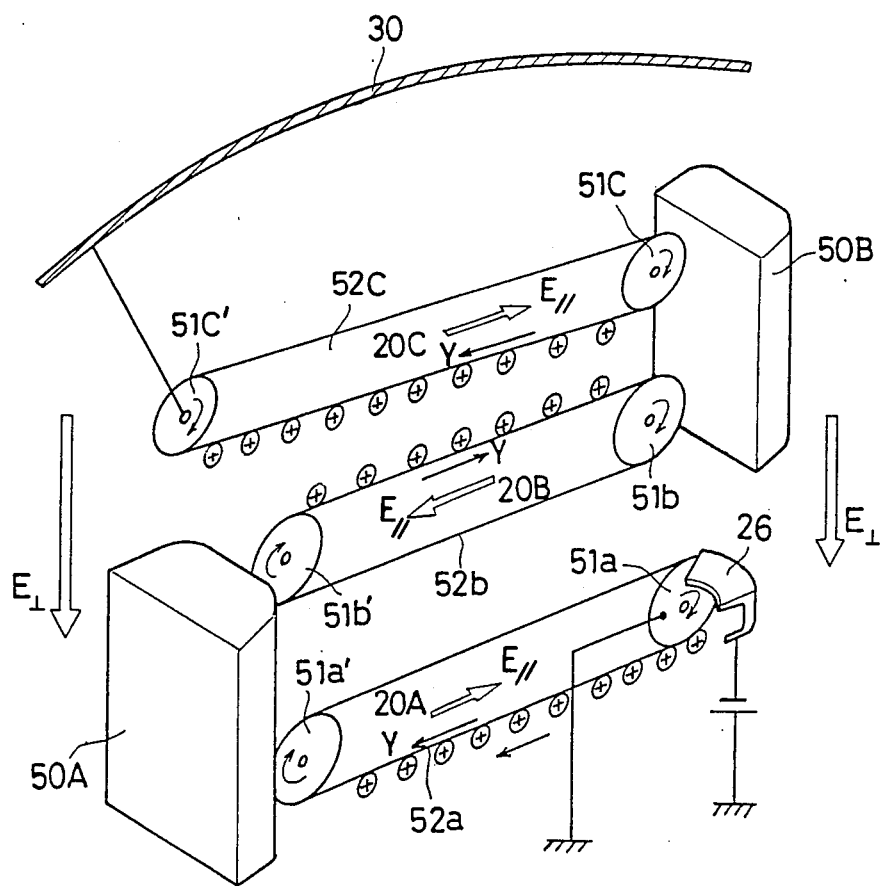
FIG. 3 is a perspective view of further another embodying example of the same.
Figure 4:
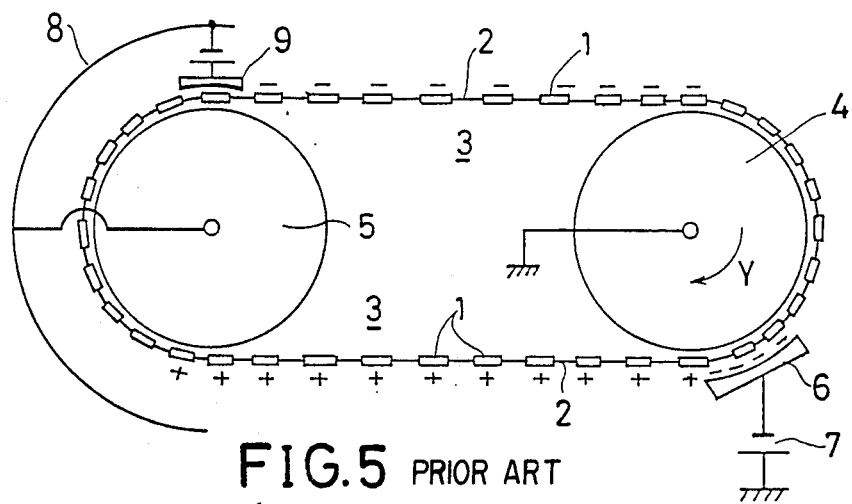
FIG. 4 is a top plan view of a conventional pellet chain type electrostatic high-voltage generator.
Figure 5:
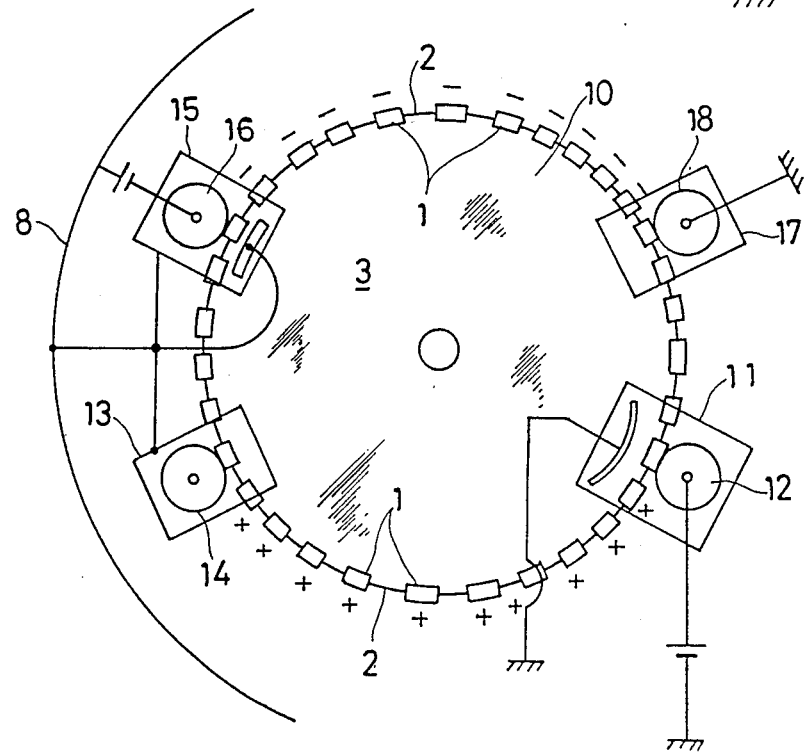
FIG. 5 is a top plan view of a conventional disc type electrostatic high voltage generator.

In another embodying example shown in FIG. 3, respective charge carrier units 20A, 20B, 20C are formed into pellet chain type ones comprising pulleys 51a, 51a', 51b, 51b' and 51c, 51c', and pellet chains 52a, 52b and 52c arranged to be moved in the directions shown by arrows Y.

Also in this pellet chain type electrostatic high-voltage generator, if a positive electric charge is given to pellets of the pellet chain 52a of the first stage from a ground side inductor 26, the same is transferred to the pellet of the pellet chain 52b of the second stage through a first charge carrying transfer unit 50A, and is further transferred to the pellet chain 52C of the third stagethrough a second charge carrying transfer unit 50B, and is finally stored in a high voltage electrode 30 for obtaining a high-voltage. The voltage if this high-voltage electrode 30 is three times as high as the voltage obtained by a single charge carrier unit.

Also in the case of the pellet chain type one of FIG. 3, the relation between the intensity of electric field $E_{//}$ along on the charge carrying path and the potential gradient $E_1$ in the direction at right angles with the charge carrying path is entirely equal to that in the case of the disc type one of FIG. 2. Additionally, in FIGS. 2 and 3, there has been shown only the manner of transporting of the positive electric charges, but there can be obtained a double electric current by giving negative electric charge in a returning direction of each of the charge carrying units 20A, 20B, 20C, as shown in FIG. 1.

Though a concrete construction is not illustrated, a mechanism including the charge carrier units shown in any of FIGS. 1, 2 and 3 is accommodated in a container filled with a $SF_6$ insulating gas, so that the same may be constructed into a compact electrostatic high-voltage generator by the gas insulated construction. Additionally, it is possible to transfer the electric charges stably by connecting a resistance to the middle portion of each of the conductors 35, 36, 37 for interconnecting between the charge carrying transfer inductors as shown in FIG. 1 and thereby each circuit is increased in weight.

EFFECT OF INVENTION

Thus, accoridng to this invention, plural layers of charge carrier units are stacked in a direction at right angles with the direction of carrying the charge, and there is provided, between respective adjacent ones of those charge carrier units, a charge carrying transfer unit for transfer the electric charge carried in one unit to the adjacent unit, so that there can be obtained an ultra high-voltagee type electrostatic high-voltage generator fully utilizing that the highest potential gradient in the direction of stacking of those units is above 20 Mv/m, and additionally a volume in the direction of stacked units is increased, but the installation area is not especially increased, so that the whole thereof can be constructed economically into a small-sized one.

I claim:

1. an electrostatic high-voltage generator in which an electrostatic charge is transported mechanically and is stored on a high-voltage electrode, comprising: a plurality of charge carrier units (20A, 20B), each of said charge carrier units having a continuously moving peripheral edge and a plurality of conductive pellets secured to said peripheral edge, said plurality of charge carrier units being spaced from one another and arranged in a direction at right angles to the direction of movement of said peripheral edges of said carrier units to provide a stack of said charged carrier units a first one (20A) of said plurality of charge carrier units in said stack having a ground-side inductor (26) for positive charging of said conductive pellets to carry a positive electric charge thereon and with a ground-side collector electrode (29) collecting a negative electric charge from said conductive pellets carrying a negative electric charge, a lst one (20B) of said plurality of charge carrier units in said stack having an inductor (34) with an electrode connected to a high-voltage electrode for negative charging of said conductive pellets to carry a negative electric charge thereon and having a high-voltage side collector inductor (33) which collects a positive electric charge from conductive pellets carrying a positive electric charge thereon and carries said positive electric charge to said high-voltage electrode, and a charge carrying transfer unit (50) for transferring electric charges from electrically charged pellets on one of said charge carrier units (20A) (20B) to the conductive pellets of an adjacent charge carrier unit and for transferring electric charges of opposite polarity from said adjacent charge carrier unit to said one of said charge carrier units whereby a procession of said pellets during less than one half the movement of said peripheral edge of each carrier unit carries a positive electric charge and said plurality of pellets during less than the remaining one half of the movement of said peripheral edge carries a negative electric charge, said positive and negative charges carried by said peripheral processions of said pellets are transported from one charge carrier unit to an adjacent charge carrier unit and said positively charged procession of said pellets of said one charge carrier unit is maintained opposite said negatively charged procession of pellets of said adjacent charge carrier unit.

2. An electrostatic high-voltage generator as claimed in claim 1, wherein the charge carrying transfer unit comprises a first inductor for receiving a positive electric charge carried by said conductive pellets of said one said charge carrier units, a second inductor which is electrically connected to the first inductor and serves to give the positive electric charge received thereby to conductive pellets of said adjacent charge carrier unit, a third inductor for receiving a negative electric charge carried by conductive pellets of the charge carrier unit, and a fourth inductor which is electrically connected to the third inductor and arranged to give a negative electric charge received thereby to the conductive pellets of said one charge carrier unit.

3. An electrostatic high-voltage generator as claimed in claim 2, wherein said first, second, third and fourth inductors constituting said charge carrying transfer unit are respectively composed of conductive pulleys arranged to contact conductive pellets of respective ones of said carrier units and respective inductor electrodes facing the respective conductive pulleys through the condcutive pellets, and the first and third inductors are so arranged that the conductive pulleys and the inductor electrodes are electrically connected together, and the conductive pulleys of the first and second inductors are electrically connected together, and the conductive pulleys of the third and fourth inductors are electrically connected together, and the inductor electrodes of the second and fourth inductors are electrically connected together.

4. An electrostatic high-voltage generator as in any of claims 2, 3 or 1, in which each charge carrier unit is a pellet chain type charge carrier unit.

5. An electrostatic high-voltage generator as in any of claims 2, 3 or 1, in which each charge carrier unit is a disc type charge carrier unit.

* * * * *